(12) United States Patent
Kim et al.

(10) Patent No.: US 9,955,479 B2
(45) Date of Patent: Apr. 24, 2018

(54) METHOD AND APPARATUS FOR TRANSMITTING OR RECEIVING SOUNDING REFERENCE SIGNAL IN WIRELESS COMMUNICATION SYSTEM

(71) Applicant: LG ELECTRONICS INC., Seoul (KR)

(72) Inventors: Bonghoe Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 15/302,477

(22) PCT Filed: Apr. 11, 2016

(86) PCT No.: PCT/KR2016/003785
§ 371 (c)(1),
(2) Date: Oct. 6, 2016

(87) PCT Pub. No.: WO2016/163847
PCT Pub. Date: Oct. 13, 2016

(65) Prior Publication Data
US 2017/0150499 A1    May 25, 2017

Related U.S. Application Data

(60) Provisional application No. 62/145,530, filed on Apr. 10, 2015.

(51) Int. Cl.
*H04W 72/04* (2009.01)
*H04L 5/00* (2006.01)
(Continued)

(52) U.S. Cl.
CPC ....... *H04W 72/0446* (2013.01); *H04L 5/0048* (2013.01); *H04L 5/14* (2013.01); *H04W 72/0413* (2013.01); *H04W 72/1268* (2013.01)

(58) Field of Classification Search
CPC .... H04L 5/0048; H04L 5/0051; H04L 5/0023
See application file for complete search history.

(56) References Cited

U.S. PATENT DOCUMENTS 9,749,968 B2 *   8/2017  Stern-Berkowitz . H04W 52/325
2011/0013546 A1 *  1/2011  Hao ..................... H04L 5/0007
370/294

(Continued)

FOREIGN PATENT DOCUMENTS

JP      2012231311       11/2012
KR   10-2014-0138616     12/2016
(Continued)

OTHER PUBLICATIONS

PCT International Application No. PCT/KR2016/003785, Written Opinion of the International Searching Authority dated Jul. 19, 2016, 23 pages.

(Continued)

*Primary Examiner* — Charles C Jiang
*Assistant Examiner* — Will Lin
(74) *Attorney, Agent, or Firm* — Lee, Hong, Degerman, Kang & Waimey

(57) ABSTRACT

A method for transmitting a sounding reference signal (SRS) by a user equipment (UE) in a wireless communication system supporting Time Division Duplex (TDD) includes: receiving transmission comb (TC) information indicating any one of a total of 4 TCs supported by a 4-TC SRS; mapping the 4-TC SRS to an SRS symbol of an Uplink Pilot Time Slot (UpPTS) of a TDD special subframe based on the TC information; and transmitting the 4-TC SRS through the UpPTS. In the mapping of the 4-TC SRS, the 4-TC SRS is mapped in a unit of 1 resource element (RE) per 4 REs on the SRS symbol based on a TC indicated by the TC (Continued)

information. The transmission of the 4-TC SRS is supported when a plurality of symbols are configured in the UpPTS.

15 Claims, 12 Drawing Sheets

(51) Int. Cl.
*H04L 5/14* (2006.01)
*H04W 72/12* (2009.01)

(56) References Cited

U.S. PATENT DOCUMENTS

| | | | | |
|---|---|---|---|---|
| 2011/0170462 | A1* | 7/2011 | Hao | H04W 74/002 370/280 |
| 2011/0261716 | A1* | 10/2011 | Kim | H04B 7/0671 370/252 |
| 2011/0268028 | A1* | 11/2011 | Stern-Berkowitz | H04L 5/0048 370/328 |
| 2012/0014349 | A1* | 1/2012 | Chung | H04B 7/0684 370/329 |
| 2012/0057516 | A1* | 3/2012 | Ahn | H04L 5/0048 370/312 |
| 2012/0314743 | A1* | 12/2012 | Yoon | H04L 27/2607 375/219 |
| 2013/0039233 | A1 | 2/2013 | Dal et al. | |
| 2013/0051356 | A1* | 2/2013 | Hong | H04L 5/0053 370/329 |
| 2013/0083683 | A1 | 4/2013 | Hwang et al. | |
| 2013/0242911 | A1* | 9/2013 | Heo | H04L 5/001 370/329 |
| 2013/0343359 | A1 | 12/2013 | Li et al. | |
| 2014/0064213 | A1* | 3/2014 | Guo | H04L 5/0048 370/329 |
| 2016/0013907 | A1* | 1/2016 | Li | H04L 5/0051 370/280 |

FOREIGN PATENT DOCUMENTS

| | | |
|---|---|---|
| WO | 2011/108905 | 9/2011 |
| WO | 2014142576 | 9/2014 |

OTHER PUBLICATIONS

3GPP, "Physical Channels and Modulation (Release 12)" 3GPP TSG RAN E-UTRA; TS 36.211 V12.4.0, Jan. 6, 2015, 124 pages.

* cited by examiner (a) CONTROL-PLANE PROTOCOL STACK (b) USER-PLANE PROTOCOL STACK

METHOD AND APPARATUS FOR TRANSMITTING OR RECEIVING SOUNDING REFERENCE SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2016/003785, filed on Apr. 11, 2016, which claims the benefit of U.S. Provisional Application No. 62/145,530, filed on Apr. 10, 2015, the contents of which are all hereby incorporated by reference herein in their entirety.

TECHNICAL FIELD

The present invention relates to a wireless communication system, and more particularly to a method and apparatus for transmitting or receiving a sounding reference signal (SRS) through a special subframe in a Time Division Duplex (TDD) wireless communication system.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

An object of the present invention is to provide a method and apparatus for more efficiently transmitting or receiving a sounding reference signal (SRS) by increasing a maximum transmission Comb supportable by the SRS in a TDD-support wireless communication system.

Technical Solution

The object of the present invention can be achieved by providing a method for transmitting a sounding reference signal (SRS) by a user equipment (UE) in a wireless communication system supporting Time Division Duplex (TDD) comprising: receiving transmission comb (TC) information indicating any one of a total of 4 TCs supported by a 4-TC SRS; mapping the 4-TC SRS to an SRS symbol of an Uplink Pilot Time Slot (UpPTS) of a TDD special subframe based on the TC information; and transmitting the 4-TC SRS through the UpPTS. In the mapping of the 4-TC SRS, the 4-TC SRS is mapped in a unit of 1 resource element (RE) per 4 REs on the SRS symbol based on a TC indicated by the TC information. The transmission of the 4-TC SRS is supported when a plurality of symbols are configured in the UpPTS.

In another aspect of the present invention, a user equipment (UE) for transmitting a sounding reference signal (SRS) in a wireless communication system supporting Time Division Duplex (TDD) includes: a receiver configured to receive transmission comb (TC) information indicating any one of a total of 4 TCs supported by a 4-TC SRS; a processor configured to map the 4-TC SRS to an SRS symbol of an Uplink Pilot Time Slot (UpPTS) of a TDD special subframe based on the TC information; and a transmitter configured to transmit the 4-TC SRS through the UpPTS. The processor maps the 4-TC SRS in a unit of 1 resource element (RE) per 4 REs on the SRS symbol based on a TC indicated by the TC information. The 4-TC SRS transmission is supported when a plurality of symbols are configured in the UpPTS.

In another aspect of the present invention, a method for receiving a sounding reference signal (SRS) by a base station (BS) in a wireless communication system supporting Time Division Duplex (TDD) includes: transmitting transmission comb (TC) information indicating any one of a total of 4 TCs supported by a 4-TC SRS; and receiving the 4-TC SRS mapped to an SRS symbol of an Uplink Pilot Time Slot (UpPTS) of a TDD special subframe based on the TC information, wherein the 4-TC SRS is mapped in a unit of 1 resource element (RE) per 4 REs on the SRS symbol based on a TC indicated by the TC information, and the transmission of the 4-TC SRS is supported when a plurality of symbols are configured in the UpPTS.

If a single symbol is configured in the UpPTS, the single symbol may support transmission of a 2-TC SRS other than the 4-TC SRS.

The index of the SRS symbol mapped to the 4-TC SRS within the UpPTS may be fixed.

The 4-TC SRS transmission may be disallowed in an uplink subframe in which a 2-TC SRS is transmitted.

The method may further include receiving information on an additional symbol available for SRS transmission from a base station (BS) through RRC signaling.

The 4-TC SRS may be transmitted through one or two of a plurality of antenna ports of the UE.

If the 4-TC SRS is transmitted through a single antenna port, the single antenna port $srs_p(n)$ is determined by the following equation A, $$srs_p(n) = n \bmod M \qquad \text{[Equation A]}$$

$$n = \left\lfloor \frac{\left(10 \cdot n_f + \left\lfloor \frac{n_s}{2} \right\rfloor\right)}{T_{SRS}} \right\rfloor$$

where M is the number of reception (Rx) antennas of the UE, $n_f$ is a system frame number (SFN), $n_s$ is a slot number, and $T_{SRS}$ is a UE-specific SRS transmission periodicity.

If the 4-TC SRS is transmitted through two antenna ports, the two antenna ports $srs_p(n)$ and $srs_{p+1}(n)$ are determined by the following equation B, $$srs_p(n) = 2 \cdot \left(n \bmod \frac{M}{2}\right) \qquad \text{[Equation B]}$$

$$srs_{p+1}(n) = 2 \cdot \left(n \bmod \frac{M}{2}\right) + 1$$

$$n = \left\lfloor \frac{\left(10 \cdot n_f + \left\lfloor \frac{n_s}{2} \right\rfloor\right)}{T_{SRS}} \right\rfloor$$

where M is the number of reception (Rx) antennas of the UE, $n_f$ is a system frame number (SFN), $n_s$ is a slot number, and $T_{SRS}$ is a UE-specific SRS transmission periodicity.

Advantageous Effects

As is apparent from the above description, the embodiments of the present invention can increase multiplex capacity of a sound reference signal (SRS) because the number of transmission combs (TCs) supported by the SRS is extended to 4, and can efficiently manage insufficient uplink (UL) resources and SRS transmission overhead caused by SRS transmission in a TDD system because the SRS is transmitted through an uplink pilot time slot (UpPTS).

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications. In the present disclosure, a base station (eNB) may be used as a broad meaning including a remote radio head (RRH), an eNB, a transmission point (TP), a reception point (RP), a relay, etc.

Figure 1:
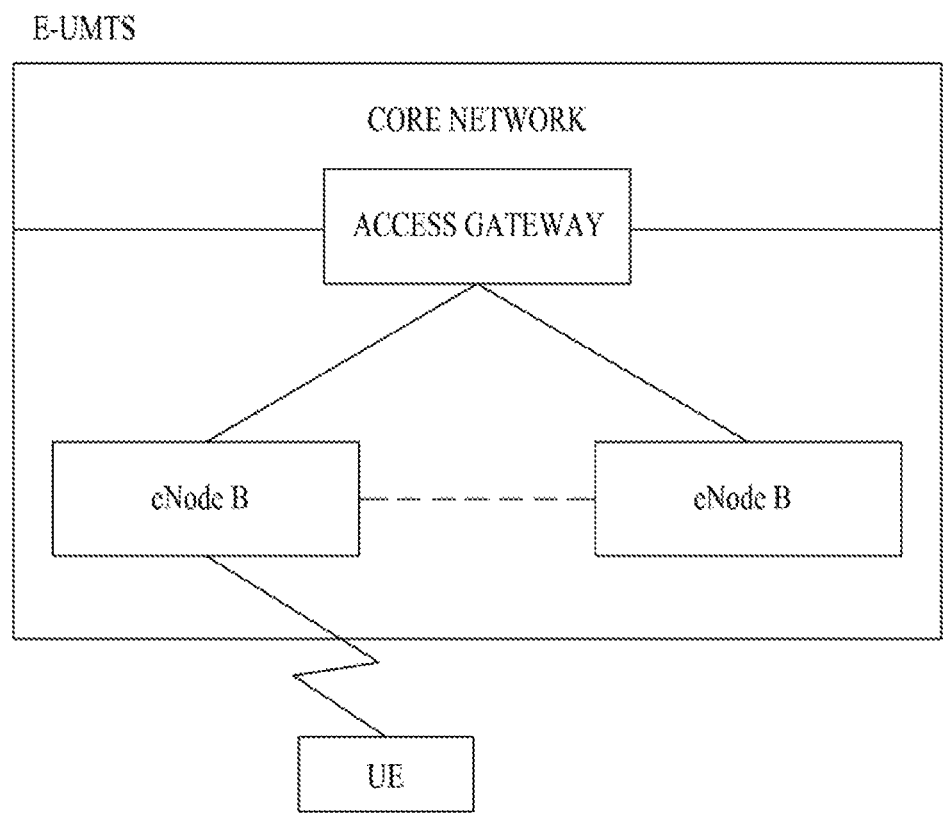
FIG. 1 is a diagram schematically illustrating a network structure of an E-UMTS as an exemplary radio communication system.
Figure 2:
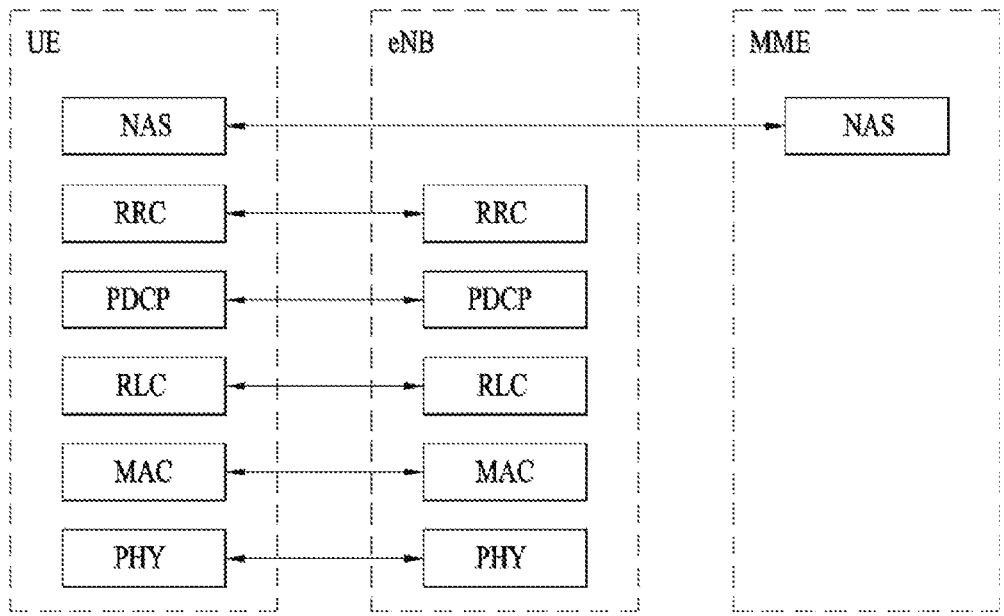
FIG. 2 is a diagram illustrating structures of a control plane and a user plane of a radio interface protocol between a UE and an E-UTRAN based on the 3GPP radio access network specification.
Figure 2:
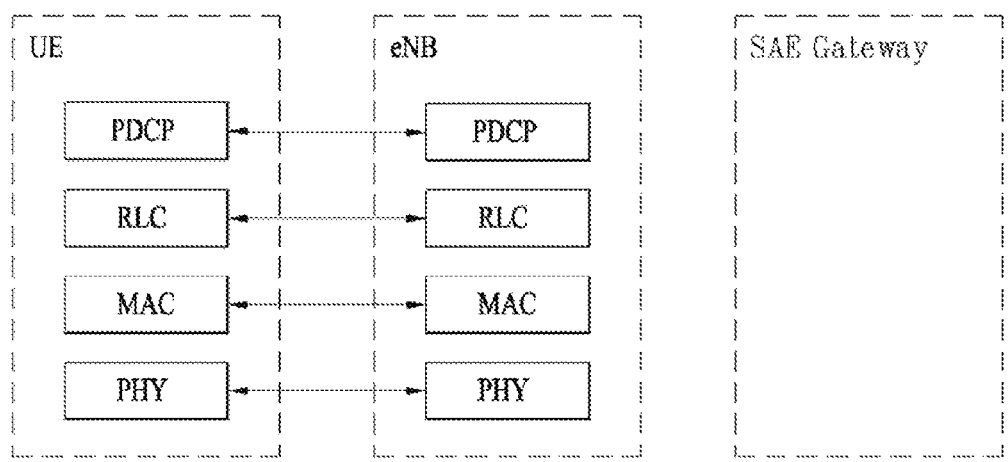

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constituting an eNB is set to one of the bandwidths of 1.44, 3, 5, 10, 15 and 20 Mhz and provides DL or UL transmission service to a plurality of UEs in the bandwidth. Different cells may be configured so as to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
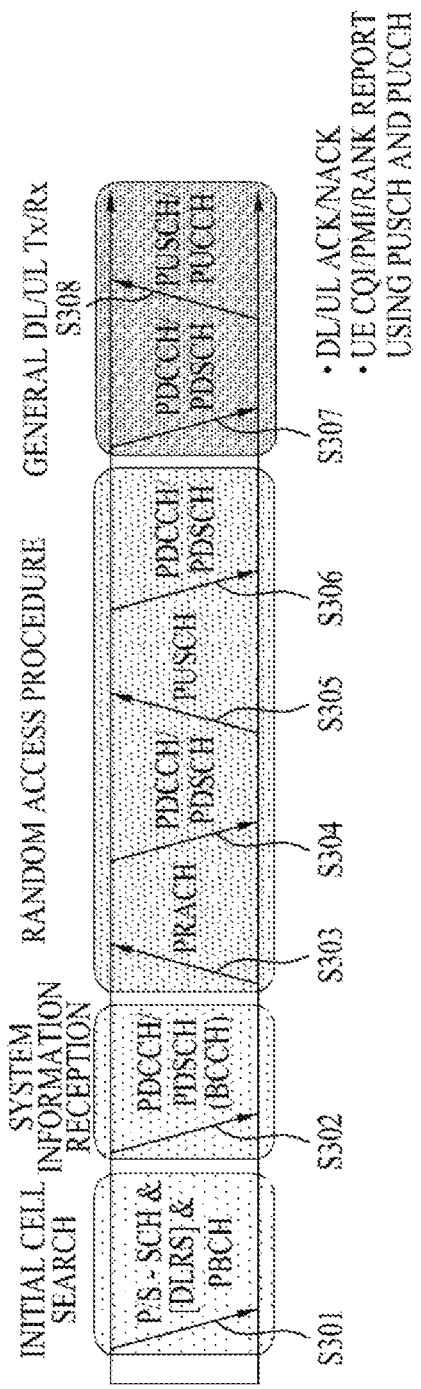
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
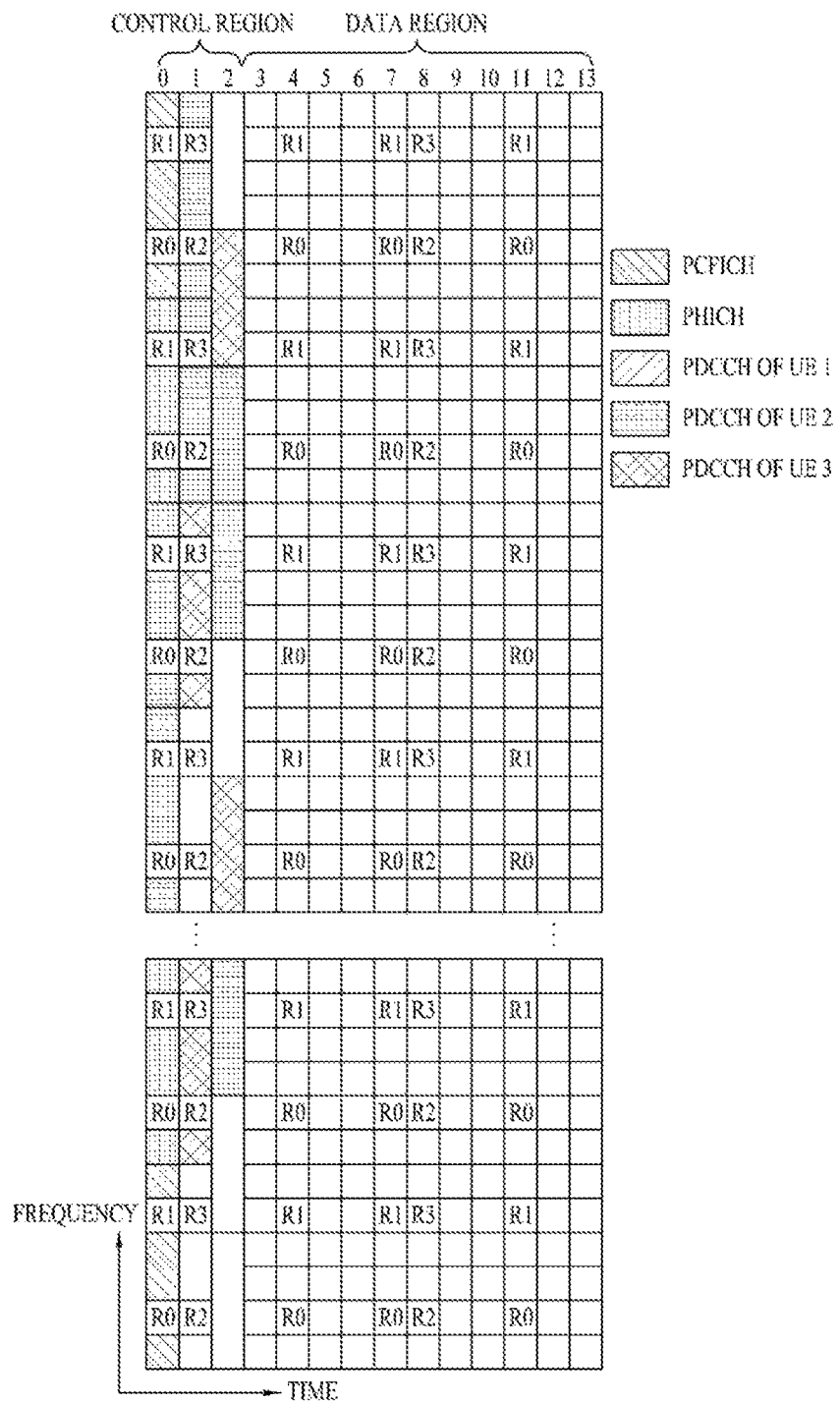
FIG. 4 is a diagram illustrating the structure of a DL radio frame used in an LTE system.

FIG. 4 is a diagram illustrating control channels contained in a control region of one subframe in a DL radio frame.

Referring to FIG. 4, one subframe includes 14 OFDM symbols. The first to third ones of the 14 OFDM symbols may be used as a control region and the remaining 11 to 13 OFDM symbols may be used as a data region, according to subframe configuration. In FIG. 4, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 5:
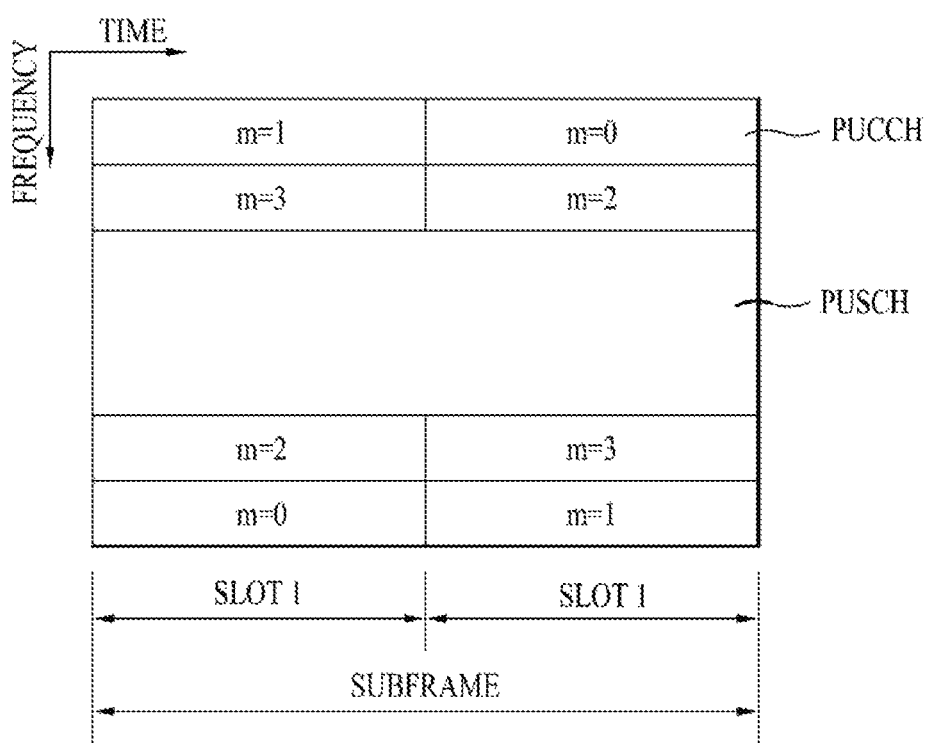
FIG. 5 is a diagram illustrating the structure of a UL subframe in an LTE system.

FIG. 5 is a diagram illustrating the structure of a UL subframe in an LTE system.

Referring to FIG. 5, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 5.

And, time capable of transmitting a sounding reference signal in a subframe corresponds to a symbol period lastly positioned in a subframe in a time axis and the sounding reference signal is transmitted through a data transmission band in frequency axis. Sounding reference signals of a plurality of UEs transmitted through a last symbol of an identical subframe can be distinguished from each other according to a frequency position.

Figure 6:
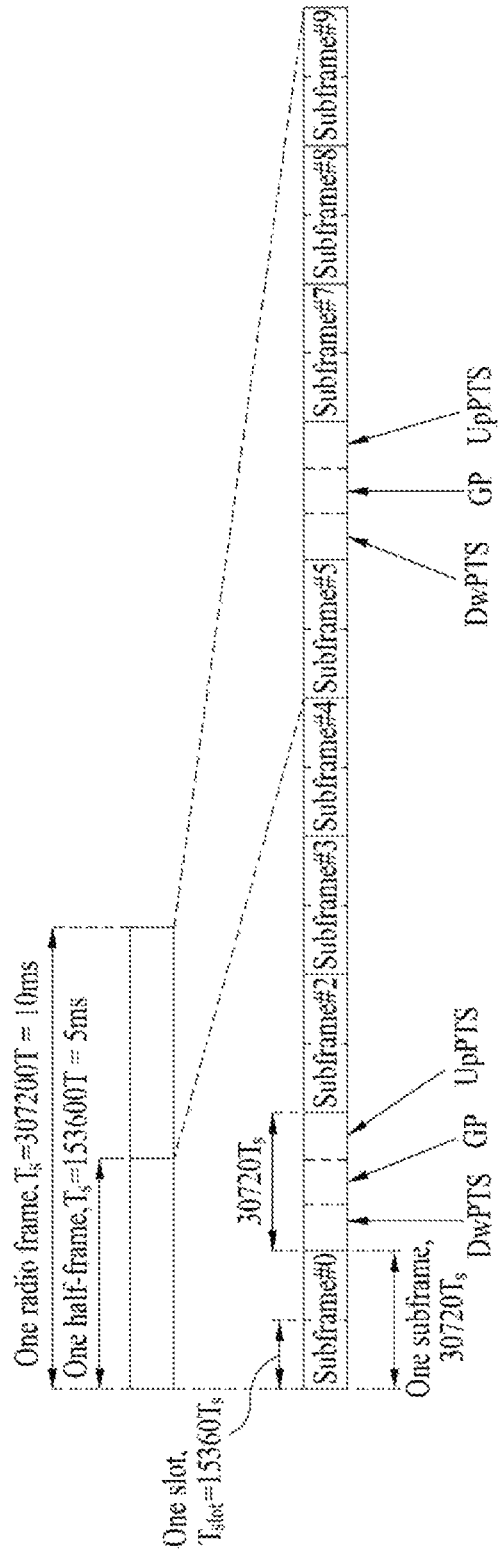
FIG. 6 illustrates a structure of a radio frame in an LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 1 below.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D, U, and S refer to a downlink subframe, an uplink subframe, and the special subframe. In addition, Table 1 also shows downlink-to-uplink switch-point periodicity in an uplink/downlink subframe configuration in each system.

Figure 7:
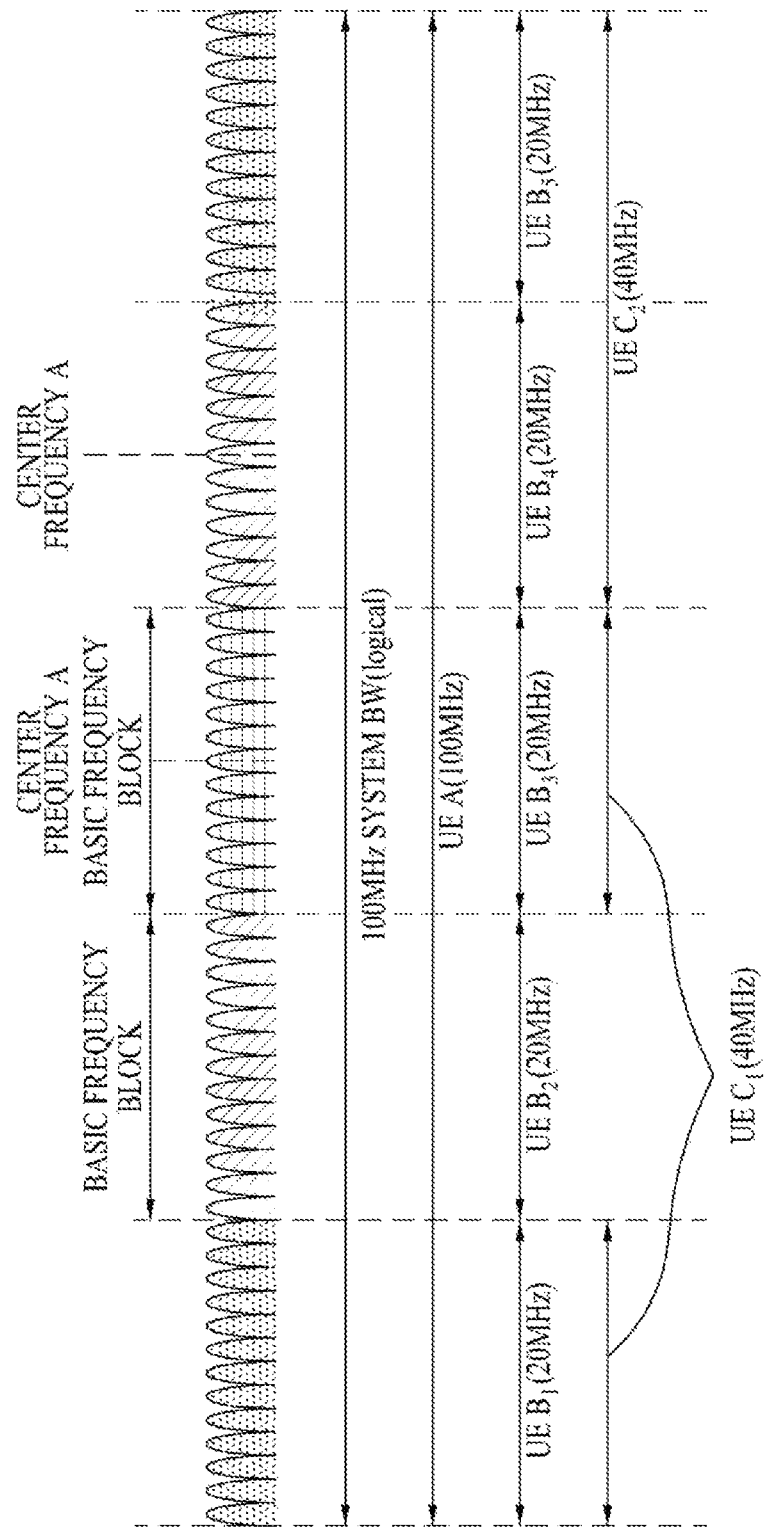
FIG. 7 is a view illustrating concept of a carrier aggregation scheme.

Hereinafter, a carrier aggregation scheme will be described. FIG. 7 is a view illustrating concept of a carrier aggregation scheme.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' will consistently used.

Figure 8:
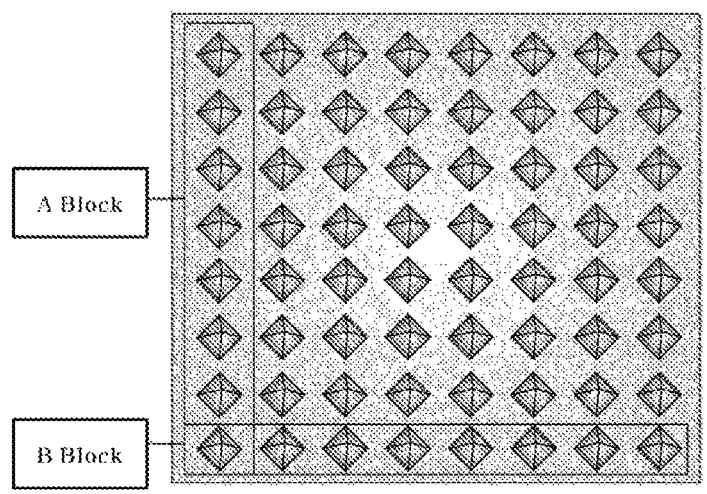
FIG. 8 is a view illustrating an antenna array according to an embodiment of the present invention.

Referring to FIG. 7, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 7 illustrates the case in which component carriers have the same bandwidth, the case is purely exemplary, and thus, the component carriers may have different bandwidths. In addition, although FIG. 7 illustrates the case in which the component carriers are adjacent to each other in the frequency domain, FIG. 8 are logically illustrated, and thus, the component carriers may be physically adjacent to each other or may be spaced apart from each other.

Component carriers can use different center frequencies or use one common center frequency with respect to physically adjacent component carriers. For example, in FIG. 8, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers as illustrated in FIG. 7. In this case, a method for scheduling a data channel by a control channel may be classified into a linked carrier scheduling method and a cross carrier scheduling method.

In more detail, in the linked carrier scheduling method, a control channel transmitted through a specific component carrier schedules only a data channel through the specific component carrier like in a legacy LTE system using a single component carrier.

Meanwhile, in the cross carrier scheduling method, a control channel transmitted through a primary component carrier (primary CC) using a carrier indicator field (CIF) schedules a data channel transmitted through a data channel transmitted through the primary CC or a secondary CC.

A description will be given of a method for controlling uplink transmission power in an LTE system.

A method for controlling, by a UE, uplink transmission power thereof includes open loop power control (OLPC) and closed loop power control (CLPC). The former controls power in such a manner that attenuation of a downlink signal from a base station of a cell to which a UE belongs is estimated and compensated for. OLPC controls uplink power by increasing uplink transmission power when downlink signal attenuation increases as a distance between the UE and the base station increases. The latter controls uplink power in such a manner that the base station directly transmits information (i.e. a control signal) necessary to control uplink transmission power.

The following equation 1 is used to determine transmission power of a UE when a serving cell c transmits only a PUSCH instead of simultaneously transmitting the PUSCH and a PUCCH in a subframe corresponding to a subframe index i in a system that supports carrier aggregation.

$$P_{PUSCH,c}(i) = \min \begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases} [dBm] \quad \text{[Equation 1]}$$

The following equation 2 is used to determine PUSCH transmission power when the serving cell c simultaneously transmits the PUCCH and the PUSCH in the subframe corresponding to the subframe index i in a system supporting carrier aggregation.

$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases} [dBm] \quad \text{[Equation 2]}$$

Parameters, which will be described in association with Equations 1 and 2, determine uplink transmission power of a UE in the serving cell c. Here, $P_{CMAX,c}(i)$ in Equation 1 indicates maximum transmittable power of the UE in the subframe corresponding to the subframe index i and $\hat{P}_{CMAX,c}(i)$ in Equation 2 indicates a linear value of $P_{CMAX,c}(i)$. $\hat{P}_{PUCCH}(i)$ in Equation 2 indicates a linear value of $P_{PUCCH}(i)$ ($P_{PUCCH}(i)$ indicating PUCCH transmission power in the subframe corresponding to subframe index i).

In Equation 1, $M_{PUSCH,c}(i)$ is a parameter indicating a PUSCH resource allocation bandwidth, which is represented as the number of resource blocks valid for the subframe index i, and is allocated by a base station. $P_{O\_PUSCH,c}(j)$ is a parameter corresponding to the sum of a cell-specific nominal component $P_{O\_NOMINAL\_PUSCH,c}(j)$ provided by a higher layer and a UE-specific component $P_{O\_UE\_PUSCH,c}(j)$ provided by the higher layer and is signaled to the UE by the base station.

j is 1 in PUSCH transmission/retransmission according to an uplink grant and j is 2 in PUSCH transmission/retransmission according to a random access response. In addition, $P_{O\_UE\_PUSCH,c}(2)=0$ and $P_{O\_NOMINAL\_PUSCH,c}(2)=P_{O\_PRE}+\Delta_{PREAMBLE\_Msg3}$. Parameters $P_{O\_PRE}$ and $\Delta_{PREAMBLE\_Msg3}$ are signaled by the higher layer.

$\alpha_c(j)$ is a pathloss compensation factor and a cell-specific parameter provided by the higher layer and transmitted as 3 bits by the base station. $\alpha \square \{0, 0.4, 0.5, 0.6, 0.7, 0.8, 0.9, 1\}$ when j is 0 or 1 and $\alpha_c(j)=1$ when j is 2. $\alpha_c(j)$ is a value signaled to the UE by the base station.

Pathloss $PL_c$ is a downlink pathloss (or signal loss) estimate value in dBs, calculated by the UE, and is represented as $PL_c$=referenceSignalPower–higher layer filteredRSRP. Here, referenceSignalPower can be signaled to the UE by the base station via the higher layer.

$f_c(i)$ is a value indicating current PUSCH power control adjustment state for the subframe index i and can be represented as a current absolute value or accumulated value. When accumulation is enabled on the basis of a parameter provided by the higher layer or a TPC command $\delta_{PUSCH,c}$ is included in a PDCCH along with DCI format 0 for the serving cell C in which CRC is scrambled with temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled through the PDCCH with DCI format 0/4 or 3/3A in a subframe $i-K_{PUSCH}$. Here, $f_c(0)$ is the first value after reset of the accumulated value.

$K_{PUSCH}$ is defined in LTE as follows.

For FDD (Frequency Division Duplex), $K_{PUSCH}$ has a value of 4. As to TDD, $K_{PUSCH}$ has values as shown in Table 2.

TABLE 2

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The UE attempts to decode a PDCCH in DCI format 0/4 with C-RNTI thereof or to decode a PDCCH in DCI format 3/3A and a DCI format for SPS C-RNTI with TPC-PUSCH-RNTI thereof in each subframe in cases other than DRX state. When DCI formats 0/4 and 3/3A for the serving cell c are detected in the same subframe, the UE needs to use $\delta_{PUSCH,c}$ provided in DCI format 0/4. When a TPC command decoded for the serving cell c is not present, DRX is generated or a subframe having index i is a subframe other than an uplink subframe in TDD, $\delta_{PUSCH,c}$ is 0 dB.

Accumulated $\delta_{PUSCH,c}$, which is signaled together with DCI format 0/4 on a PDCCH, is shown in Table 3. When a PDCCH with DCI format 0 is validated through SPS activation or released, $\delta_{PUSCH,c}$ is 0 dB. Accumulated $\delta_{PUSCH,c}$, which is signaled with DCI format 3/3A on a PDCCH, is one of SET1 of Table 3 or one of SET2 of Table 4, determined by a TPC-index parameter provided by the higher layer.

TABLE 3

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 4

| TPC Command Field in DCI format 3A | Accumulated $\delta_{PUSCH,c}$ [dB] |
|---|---|
| 0 | −1 |
| 1 | 1 |

When the UE reaches maximum transmission power $\hat{P}_{CMAX}(i)$ in the serving cell c, a positive TPC command is not accumulated for the serving cell c. Conversely, when the UE reaches minimum transmission power, a negative TPC command is not accumulated.

The following equation 3 is related to uplink power control with respect to a PUCCH in LTE.

$$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array}\right\} [dBm] \quad \text{[Equation 3]}$$

In Equation 3, i indicates a subframe index and c indicates a cell index. When a UE is configured by a higher layer to transmit a PUCCH over through antenna ports, $\Delta_{TxD}(F')$ is provided to the UE by the higher layer. In other cases, $\Delta_{TxD}(F')$ is 0. Parameters with respect to a cell having the cell index c will now be described.

$P_{CMAX,c}(i)$ indicates maximum transmission power of a UE, $P_{0\_PUCCH}$ is a parameter corresponding to the sum of cell-specific parameters and signaled by a base station through higher layer signaling, $PL_c$ is a downlink pathloss (or signal loss) estimate value calculated in dBs by the UE and is represented as $PL_c$=referenceSignalPower−higher layer filteredRSRP. h(n) is a value depending on PUCCH format, $n_{CQI}$ is the number of information bits with respect to channel quality information (CQI) and $n_{HARQ}$ indicates the number of HARQ bits. In addition, $\Delta_{F\_PUCCH}(F)$ is a relative value with respect to PUCCH format 1a and a value corresponding to PUCCH format #F, which is signaled by the base station through higher layer signaling. g(i) indicates a current PUCCH power control adjustment state of a subframe having index i.

g (0)=0 when $P_{O\_UE\_PUCCH}$ is changed in the higher layer and g(0)=$\Delta P_{rampup}+\delta_{msg2}$ otherwise. $\delta_{msg2}$ is a TPC command indicated in a random access response $\Delta P_{rampup}$ corresponds to total power ramp-up from the first to last preambles, provided by the higher layer.

When a UE reaches maximum transmission power $P_{CMAX,c}(i)$ in a primary cell, a positive TPC command is not accumulated for the primary cell. When the UE reaches minimum transmission power, a negative TPC command is not accumulated. The UE resets accumulation when $P_{O\_UE\_PUCCH}$ is changed by the higher layer or upon reception of a random access response.

Tables 5 and 6 show $\delta_{PUCCH}$ indicated by a TPC command in DCI formats. Particularly, Table 5 shows $\delta_{PUCCH}$ indicated in DCI formats other than DCI format 3A and Table 6 shows $\delta_{PUCCH}$ indicated in DCI format 3A.

TABLE 5

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 6

| TPC Command Field in DCI format 3A | $\delta_{PUCCH}$ [dB] |
|---|---|
| 0 | −1 |
| 1 | 1 |

Equation 4 in the following corresponds to an equation related to power control of a sounding reference signal (SRS) in LTE system.

$$P_{SRS,c}(i) = \min\begin{Bmatrix} P_{CMAX,c}(i) \\ P_{SRS\_OFFSET,c}(m) + 10\log_{10}(M_{SRS,c}) + \\ P_{O\_PUSCH,c}(j) + \alpha_c(j) \cdot PL_c + f_c(i) \end{Bmatrix}[dBm]$$ [Equation 4]

In Equation 4, i corresponds to a subframe index and c corresponds to a cell index. In this case, $P_{CMAX,c}(i)$ corresponds to maximum power capable of being transmitted by a UE and $P_{SRS\_OFFSET,c}(m)$ corresponds to a value configured by an upper layer. If m is 0, it may correspond to a case of transmitting a periodic sounding reference signal. If m is not 0, it may correspond to a case of transmitting an aperiodic sounding reference signal. $M_{SRS,c}$ corresponds to a sounding reference signal bandwidth on a subframe index i of a serving cell c and is represented by the number of resource blocks.

$f_c(i)$ corresponds to a value indicating a current PUSCH power control adjustment status for a subframe index i of a serving cell c. $P_{O\_PUSCH,c}(j)$ and $\alpha_c(j)$ are also identical to what is mentioned earlier in Equation 1 and 2.

Hereinafter, a Sounding Reference Signal (SRS) will be described.

The SRS is composed of constant amplitude zero auto correlation (CAZAC) sequences. SRSs transmitted from several UEs are CAZAC sequences $r^{SRS}(n)=r_{u,v}^{(\alpha)}(n)$ having different cyclic shift values α according to Equation 1.

$$\alpha = 2\pi\frac{n_{SRS}^{cs}}{8}$$ [Equation 1]

where, $n_{SRS}^{cs}$ is a value set to each UE by a higher layer and has an integer value of 0 to 7. Accordingly, the cyclic shift value may have eight values according to $n_{SRS}^{cs}$.

CAZAC sequences generated from one CAZAC sequence through cyclic shift have zero correlation values with sequences having different cyclic shift values. Using such property, SRSs of the same frequency domain may be divided according to CAZAC sequence cyclic shift values. The SRS of each UE is allocated onto the frequency axis according to a parameter set by the eNB. The UE performs frequency hopping of the SRS so as to transmit the SRS with an overall uplink data transmission bandwidth.

Hereinafter, a detailed method of mapping physical resources for transmitting SRSs in an LTE system will be described.

In order to satisfy transmit power $P_{SRS}$ of a UE, an SRS sequence $r^{SRS}(n)$ first multiplied by an amplitude scaling factor $\beta_{SRS}$ and is then mapped to a resource element (RE) having an index (k, l) from $r^{SRS}(0)$ by Equation 6.

$$a_{2k+k_0,l} = \begin{cases} \beta_{SRS}r^{SRS}(k) & k = 0, 1, \ldots, MR_{sc,b}^{RS} - 1 \\ 0 & \text{otherwise} \end{cases}$$ [Equation 6]

where, $k_0$ denotes a frequency domain start point of an SRS and is defined by Equation 7.

$$k_0 = k_0' + \sum_{b=0}^{B_{SRS}} 2M_{sc,b}^{RS}n_b$$ [Equation 7]

where, $n_b$ denotes a frequency location index. $k'_0$ for a general uplink subframe is defined by Equation 8 and $k'_0$ for an uplink pilot time is defined by Equation 9.

$$k'_0 = (\lfloor N_{RB}^{UL}/2 \rfloor - m_{SRS,0}/2)N_{SC}^{RB} + k_{TC}$$ [Equation 8]

$$k'_0 = \\ m_{SRS,0}^{max})N_{sc}^{RB} + k_{TC} \quad \text{if } ((n_f \bmod 2) \times (2 - N_{SP}) + n_{hf})\bmod 2 = 0 \\ \text{otherwise}$$ [Equation 9]

In Equations 4 and 5, $k_{TC}$ denotes a transmissionComb parameter signaled to a UE via a higher layer and has a value of 0 or 1. In addition, $n_{hf}$ is 0 in an uplink pilot time slot of a first half frame and is 0 an uplink pilot slot of a second half frame. $M_{sc,b}^{RS}$ is the length, that is, the bandwidth, if the SRS sequence expressed in subcarrier units defined by Equation 10.

$$M_{sc,b}^{RS} = m_{SRS,b}N_{sc}^{RB}/2$$ [Equation 10]

In Equation 10, $m_{SRS,b}$ is a value signaled from an eNB according to an uplink bandwidth $N_{RB}^{UL}$.

The UE may perform frequency hopping of the SRS so as to transmit the SRS with the overall uplink data transmission bandwidth. Such frequency hopping is set by a parameter $b_{hop}$ having a value of 0 to 3 received from a higher layer.

If frequency hopping of the SRS is inactivated, that is, if $b_{hop} \geq B_{SRS}$, a frequency location index $n_b$ has a constant value as shown in Equation 11. Here, $n_{RRC}$ is a parameter received from a higher layer.

$$n_b = \lfloor 4n_{RRC}/m_{SRS,b} \rfloor \bmod N_b$$ [Equation 11]

Meanwhile, if frequency hopping of the SRS is activated, that is, $b_{hop} < B_{SRS}$, a frequency location index $n_b$ is defined by Equations 12 and 13.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$ [Equation 12]

-continued $$F_b(n_{SRS}) = \begin{cases} (N_b/2)\left\lfloor\dfrac{n_{SRS} \bmod \prod_{b'=b_{hop}}^{b} N_{b'}}{\prod_{b'=b_{hop}}^{b-1} N_{b'}}\right\rfloor + \left\lfloor\dfrac{n_{SRS} \bmod \prod_{b'=b_{hop}}^{b} N_{b'}}{2\prod_{b'=b_{hop}}^{b-1} N_{b'}}\right\rfloor & \text{if } N_b \text{ even} \\ \lfloor N_b/2 \rfloor \left\lfloor n_{SRS} \Big/ \prod_{b'=b_{hop}}^{b-1} N_{b'}\right\rfloor & \text{if } N_b \text{ odd} \end{cases}$$

[Equation 13]

where, $n_{SRS}$ is a parameter used to calculate the number of times of transmitting the SRS and is defined by Equation 14.

$$n_{SRS} = \begin{cases} 2N_{SP}n_f + 2(N_{SP}-1)\left\lfloor\dfrac{n_s}{10}\right\rfloor + \left\lfloor\dfrac{T_{offset}}{T_{offset\_max}}\right\rfloor, & \text{for 2 ms } SRS \text{ periodicity of } TDD \text{ frame structure} \\ \lfloor(n_f \times 10 + \lfloor n_s/2 \rfloor)/T_{SRS}\rfloor, & \text{otherwise} \end{cases}$$

[Equation 14]

In Equation 14, $T_{SRS}$ denotes the periodicity of an SRS and $T_{offset}$ denotes a subframe offset of an SRS. In addition, $n_s$ denotes a slot number and $n_f$ denotes a frame number.

A UE-specific SRS configuration index $I_{SRS}$ for setting the periodicity $T_{SRS}$ and the subframe offset $T_{offset}$ of a UE-specific SRS signal is shown in Table 7-Table 10 according to FDD and TDD. In particular, Table 7 and Table 8 indicate a FDD system and a TDD system, respectively. Table 7 and Table 8 in the following show a period related to a triggering type 0, i.e., a periodic SRS, and offset information.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 8

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

Meanwhile, in case of the periodic SRS, transmission is performed in a subframe satisfying Equation 15 in the following in a FDD system or a TDD system where $T_{SRS}$ is greater than 2 ($T_{SRS}$>2). Yet, in Equation 15, $k_{SRS}$ corresponds to {0, 1, . . . , 9} in case of the FDD system, whereas $k_{SRS}$ is determined according to Table 9 in the following in case of the TDD system.

$(10 \cdot n_f + k_{SRS} - T_{offset}) \bmod T_{SRS} = 0$ [Equation 15]

TABLE 9

| | | subframe index n | | | | | | | | |
|---|---|---|---|---|---|---|---|---|---|---|
| | | 1 | | | | | 6 | | | |
| | | 1st symbol of UpPTS | 2nd symbol of UpPTS | | | | 1st symbol of UpPTS | 2nd symbol of UpPTS | | |
| | 0 | | | 2 | 3 | 4 | 5 | | | 7 | 8 | 9 |
| $k_{SRS}$ in case UpPTS length of 2 symbols | 0 | 1 | | 2 | 3 | 4 | 5 | 6 | 7 | 8 | 9 |
| $k_{SRS}$ in case UpPTS length of 1 symbol | | 1 | | 2 | 3 | 4 | | 6 | | 7 | 8 | 9 |

And, in case of a TDD system where $T_{SRS}$ corresponds to 2 in Table 8, transmission is performed in a subframe satisfying Equation 16 in the following.

$$(k_{SRS}-T_{offset}) \bmod 5 = 0 \qquad \text{[Equation 16]}$$

Table 10 and Table 11 in the following show a period related to a triggering type 1, i.e., an aperiodic SRS, and offset information. In particular, Table 10 and Table 11 indicate a FDD system and a TDD system, respectively.

TABLE 10

| SRS Configuration Index $I_{SRS}$ | SRS Periodicity $T_{SRS,1}$ (ms) | SRS Subframe Offset $T_{offset,1}$ |
| --- | --- | --- |
| 0-1 | 2 | $I_{SRS}$ |
| 2-6 | 5 | $I_{SRS}-2$ |
| 7-16 | 10 | $I_{SRS}-7$ |
| 17-31 | reserved | reserved |

TABLE 11

| SRS Configuration Index $I_{SRS}$ | SRS Periodicity $T_{SRS,1}$ (ms) | SRS Subframe Offset $T_{offset,1}$ |
| --- | --- | --- |
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}-10$ |
| 15-24 | 10 | $I_{SRS}-15$ |
| 25-31 | reserved | reserved |

Meanwhile, if a triggering bit of the aperiodic SRS is detected in a subframe #n, an aperiodic SRS corresponding to the triggering bit is transmitted in a first subframe satisfying Equation 17 or Equation 18 in the following appearing after a subframe index #n+k (where k≥4). In particular, Equation 17 in the following is used for a FDD system or a TDD system of which $T_{SRS}$ is greater than 2 ($T_{SRS}>2$) in the Table 11. Equation 18 in the following is used for a TDD system of which $T_{SRS}$ is equal to 2 ($T_{SRS}=2$) in the Table 11. Yet, in case of the FDD system, $k_{SRS}$ corresponds to $\{0, 1, \ldots, 9\}$. In case of the TDD system, $k_{SRS}$ is determined according to the Table 9.

$$(10 \cdot n_f + k_{SRS} - T_{offset,1}) \bmod T_{SRS,1} = 0 \qquad \text{[Equation 17]}$$

$$(k_{SRS} - T_{offset,1}) \bmod 5 = 0 \qquad \text{[Equation 18]}$$

3 D-MIMO/FD-MIMO

An active antenna system (AAS) has been intensively researched and discussed. AAS may include at least one antenna including an active circuit. The AAS may change a pattern of antennas to be used according to a channel state so as to reduce interference, or may more efficiently perform beamforming.

FIG. 8 is a view illustrating an antenna array according to an embodiment of the present invention. Although FIG. 8 exemplarily illustrates a 2D-AAS having 64 antenna elements, the scope or spirit of the present invention is not limited thereto.

If the AAS has a two-dimensional (2D) structure (e.g., 2D-AAS), a main lobe of each antenna may be 3D-adjusted by the change of the antenna pattern, and a transmission beam may be adaptively established at the position of a receiver. As shown in FIG. 8, the 2D-AAS antennas are installed in vertical and horizontal directions, such that a large-scale antenna system can be constructed.

In the 2D-AAS system, the transmitter must transmit a reference signal (RS) to inform the receiver of a channel ranging from the transmitter to the receiver. Examples of RS may include a Cell-Specific Reference Signal (CRS) or a Channel State Information-Reference Signal (CSI-RS), and the scope or spirit of the present invention is not limited thereto.

In the current LTE system, CSI-RS transmission of one antenna port (1-antenna port), 2 antenna ports (2-antenna port), 4 antenna ports (4-antenna port), or 8 antenna ports (8-antenna port) may be supported. During transmission of CSI-RSs for N-antenna ports (where n>1), N REs may be used per RB. If 2D-AAS includes a total of 64 antennas composed of 8 vertical antennas and 8 horizontal antennas, 64 REs for each RB must be used for CSI-RS according to the related art. Therefore, CSI-RS overhead (e.g., CSI-RS RE increase) caused by the increasing number of antennas may encounter the problem in the 2D-AAS system.

In order to address the increasing CSI-RS overhead problem, a method for estimating channels regarding the remaining ports using only some CSI-RS ports may be used. For example, a channel from the transmitter (e.g., 2D-AAS) to the receiver may be estimated using the Kronecker product as shown in Equation 19, and the scope or spirit of the present invention is not limited thereto.

$$H = \begin{bmatrix} H_T^{(1)} \\ H_T^{(2)} \\ \vdots \\ H_T^{(j)} \\ \vdots \\ H_T^{(N_R)} \end{bmatrix} = \begin{bmatrix} H_V^{(1)} \otimes H_H^{(1)} \\ H_V^{(2)} \otimes H_H^{(2)} \\ \vdots \\ H_V^{(j)} \otimes H_H^{(j)} \\ \vdots \\ H_V^{(N_R)} \otimes H_H^{(N_R)} \end{bmatrix} \qquad \text{[Equation 19]}$$

In Equation 19, H is a total channel from the transmitter to the receiver, and $H_T^{(j)}$ is a channel from the transmitter to the j-th reception antenna. $H_V^{(j)}$ is a channel transmitted from the vertical antenna array to the j-th antenna of the receiver, and $H_H^{(j)}$ is a channel transmitted from the horizontal antenna array to the j-th antenna of the receiver. $N_R$ is a total number of antennas of the receiver.

For example, assuming that only antennas of the block A are present as shown in FIG. 8, $H_V^{(j)}$ is a channel from the A-block antenna to the j-th antenna of the receiver. Assuming that only antennas of the block B are present as shown in FIG. 8, $H_H^{(j)}$ is a channel from the B-block antenna to the j-th antenna of the receiver. Although the above-mentioned embodiment has been disclosed from the viewpoint of one arbitrary reception (Rx) antenna for convenience of description, the following embodiments can also be applied to a plurality of Rx antennas. The following description will be disclosed using only channels from the transmitter to one arbitrary Rx antenna. Therefore, the index (j) of the Rx antenna is omitted.

$$H_T = H_V \otimes H_H \qquad \text{[Equation 20]}$$

Equation 20 is given for understanding of the present invention, and the embodiments of the present invention can be applied even when the actual channel is not identical to Equation 20.

In accordance with one embodiment of the present invention, CSI-RS having $N_V$ antenna ports arranged in the vertical direction as shown in the block A, and the other CSI-RS having $N_H$ antenna ports arranged in the horizontal direction as shown in block B are established, such that a total of two CSI-RSs can be established.

The receiver receives and measures two CSI-RSs, and performs the Kronecker product on two channel matrices as shown in FIG. 20, such that the receiver can perform channel estimation. In accordance with one embodiment, the receiver can perform channel estimation for a maximum of 64 ports through CSI-RS having 2 ports, 4 ports, or 8 ports. For example, when CSI-RS is transmitted through 8 antenna ports (8-antenna port) arranged in the horizontal direction and CSI-RS is transmitted through 8 antenna ports arranged in the vertical direction, channel estimation for a maximum of 64 antenna ports can be performed as represented by Equation 20.

Figure 9:
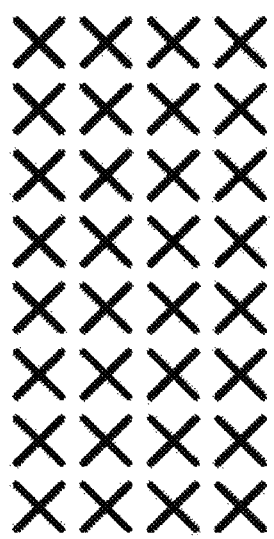
FIG. 9 is a view illustrating a cross-polarized antenna array according to an embodiment of the present invention.

FIG. 9 is a view illustrating a cross-polarized antenna array according to an embodiment of the present invention. Instead of the co-polarized antenna array shown in FIG. 8, the cross-polarized antenna array (hereinafter referred to as X-pol AA) shown in FIG. 9 may also be used.

Figure 10:
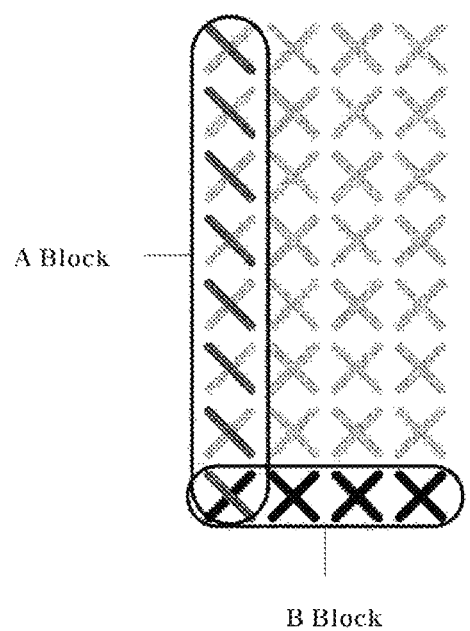
FIG. 10 is a view illustrating vertical and horizontal antenna elements for use in a 64 X-Pol antenna array according to an embodiment of the present invention.

FIG. 10 is a view illustrating vertical and horizontal antenna elements for use in a 64 X-Pol antenna array (64 X-Pol AA) according to an embodiment of the present invention.

SRS Transmission/Reception Method According to Embodiments

The SRS transmission/reception method according to embodiments will hereinafter be described.

SRS Transmission Resources

Since the number of downlink antenna elements increases in a wireless communication system supporting 3D-MIMO, RS overhead may extremely increase when all DL antenna elements (or DL antenna ports) transmit a reference signal (RS) for CSI feedback.

In the meantime, DL Tx/Rx and UL Tx/Rx are performed through the same frequency in the TDD system, such that DL channel can be estimated through RS (e.g., SRS) when using channel reciprocity. If SRS is used as described above, the downlink reference signal (DL RS) overhead increase problem caused by the increasing DL antenna elements can be addressed.

However, if the number of Tx antennas (e.g., UL antenna elements or UL antenna ports) of the UE increases, there is a need to increase resources needed for SRS transmission.

For example, according to the 3D-MIMO system, cell throughput can be increased by increasing the number of MU (Multi-User) MIMO paired users. In accordance with the method for estimating CSI of the DL channel on the basis of CSS transmission and channel reciprocity, there is a need to increase the number of UEs configured to simultaneously transmit the SRS so as to more correctly perform DL channel estimation of the MU-paired UEs. If the UEs are MU-paired through SRSs transmitted at different times, it is difficult to obtain the optimum MU-pairing result as compared to the method for performing MU-pairing of UEs through the simultaneously transmitted SRSs (e.g., considering UE mobility or the like).

As described above, according to the legacy LTE system, the SRS is transmitted through only one SC-FDMA symbol (e.g., the last symbol) in a general UL subframe according to the legacy LTE system. Assuming that only one UE transmits the SRS through one UL antenna, SRSs of a maximum of 16 UEs can be multiplexed on the basis of 8 cyclic shift (CS) values and 2 transmission combs (TCs).

However, assuming that one UE includes a plurality of antennas and transmits SRS through the plurality of antennas, 3D-MIMO throughput can be deteriorated due to reduction of SRS multiplex capacity. Assuming that one UE simultaneously transmits the SRS through N antennas using the same number of SRS symbols, the same number of cyclic shifts (CSs) and the same number of transmission combs (TCs) as in the legacy system, SRS multiplex capacity may be reduced by 1/n as compared to the legacy system. For example, assuming that the UE having 4 Tx antennas simultaneously transmits the SRS through 4 Tx antennas, SRSs of a maximum of 4 UEs can be multiplexed.

In order to address the above-mentioned problem, various embodiments for increasing SRS resources or the multiplex capacity of SRS transmission will hereinafter be described. Indexes of the following embodiments are disclosed only for illustrative purposes, and it should be noted that different inventive ideas are not always allocated to the respective embodiments. Therefore, different embodiments may also be simultaneously applied.

(1) Method for Increasing the Number of SC-FDMA Symbols for SRS Transmission

In accordance with one embodiment, SRS may be actually transmitted, or the number of SC-FDMA symbols available for SRS transmission may increase. For example, assuming that a single SC-FDMA symbol is additionally allocated to SRS transmission within a normal UL subframe, the number of SRS symbols may be 2. Therefore, the amount of SRS transmission resources may be doubled in the corresponding UL subframe. Similarly, the SC-FDMA symbol may be additionally allocated for SRS transmission within a TDD special subframe (e.g., UpPTS). For example, N symbols may be further added to one or two symbols. In more detail, 2 or 4 additional symbols may be added to UpPTS. Although symbols added to UpPTS may be added to the same UE, only some of the added symbols may also be allocated to one UE. Symbols added to UpPTS may be used for SRS transmission, and only some symbols may also be used for SRS transmission.

As described above, the base station (BS) may allocate additional symbols available for SRS transmission to the UE, and the BS may inform the UE of information (e.g., the number of additional symbols) regarding the additional symbols (e.g., RRC signaling).

Figure 11A:
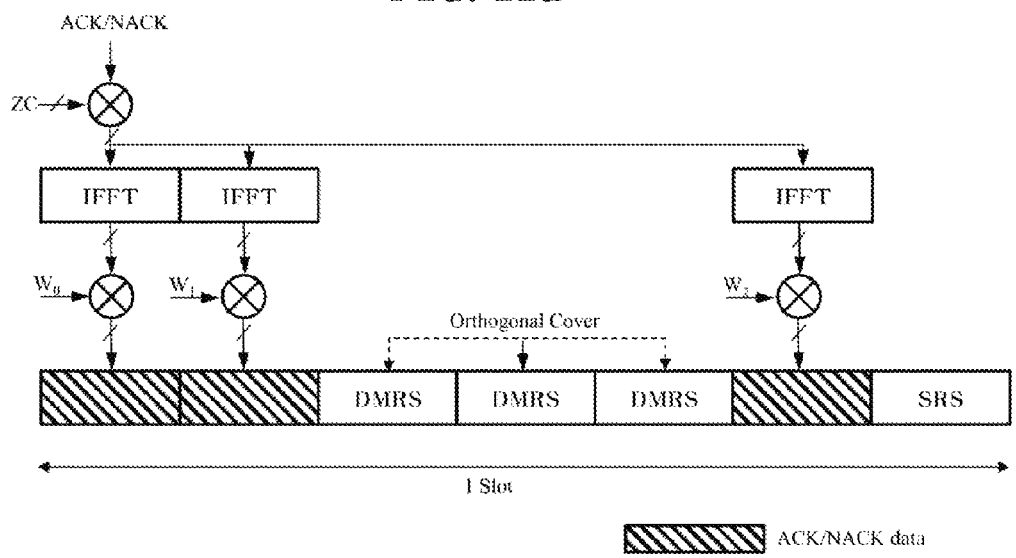
FIG. 11A is a view illustrating a shortened PUCCH format 1x for a normal CP.
Figure 12A:
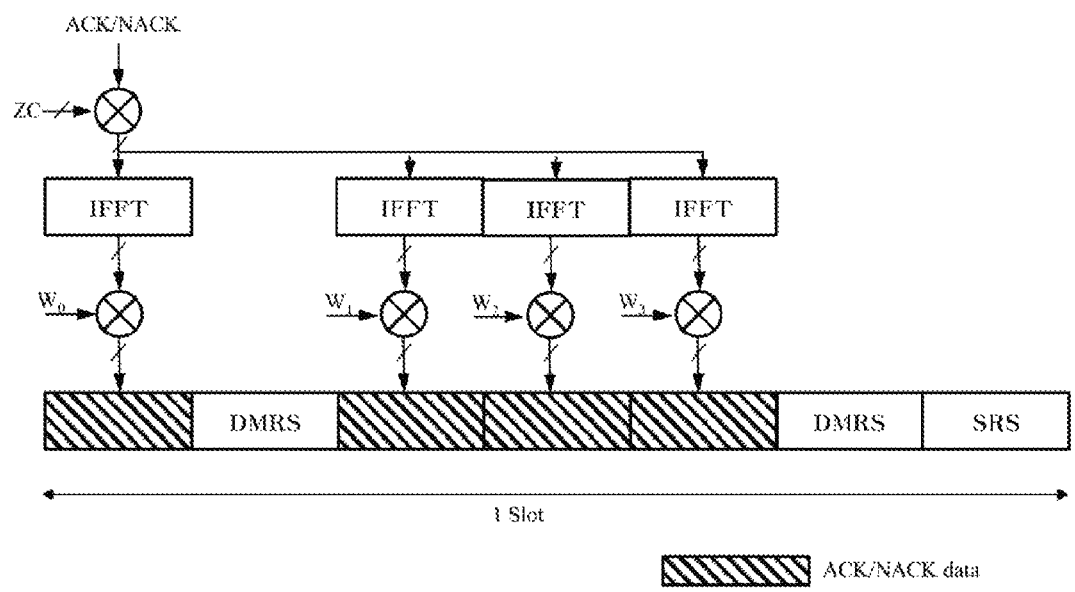
FIG. 12A is a view illustrating a shortened PUCCH format 3 for a normal CP.

As a method for transmitting the SRS in a normal UL subframe in which PUCCH transmission is scheduled, the LTE system has used the shortened PUCCH format in the second slot of the UL subframe. For example, the UE uses a normal PUCCH format I the first slot of the UL frame and uses the shortened PUCCH format in the second slot of the UL frame, such that the UE can transmit the SRS at the last symbol of the second slot. FIG. 11A is a view illustrating a shortened PUCCH format 1× for a normal CP. FIG. 12A is a view illustrating a shortened PUCCH format 3 for a normal CP. As shown in FIGS. 11A and 12A, the last one symbol of the shortened PUCCH format is allocated to SRS transmission. A single SRS symbol has been allocated to each UL subframe according to the legacy system.

If additional symbols available for SRS transmission are allocated according to one embodiment, the position of additional SRS symbols needs to be selected. When selecting the position of additional SRS symbols, the position of symbols (e.g., DMRS symbol) corresponding to RS (e.g., DMRS) of PUCCH format 1a/1b/3 for HARQ-ACK transmission may be excluded. If the additional SRS is transmitted at the DMRS symbol position, DMRS for HARQ-ACK demodulation is punctured, the HARQ-ACK detection throughput may be deteriorated.

Information on the additional symbols available for SRS transmission may be provided to the UE through L1/MAC/RRC signaling. In addition, the position of each additional symbol may be fixed in the subframe.

Figure 11B:
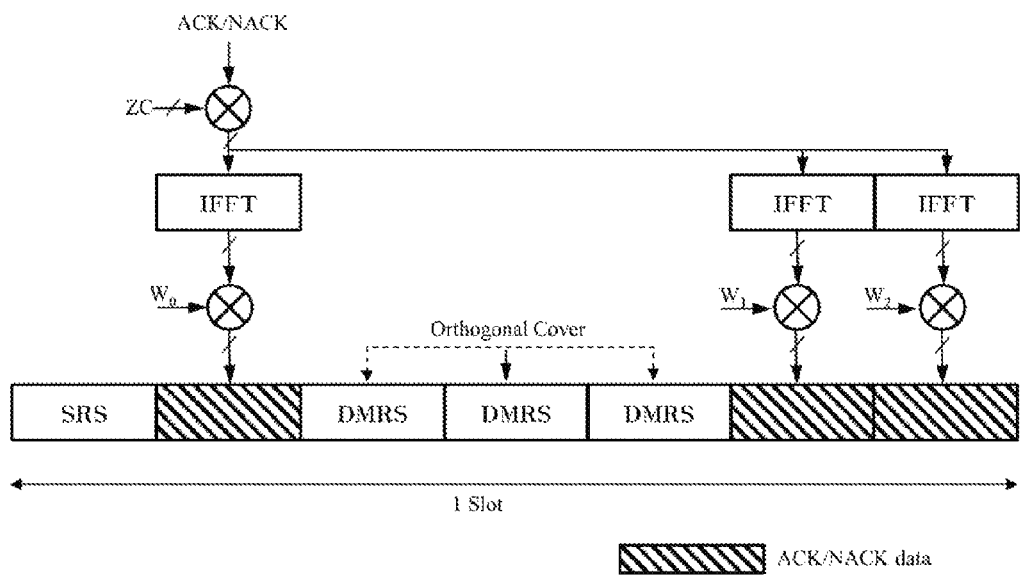
FIG. 11B is a view illustrating a shortened PUCCH format according to an embodiment of the present invention.
Figure 12B:
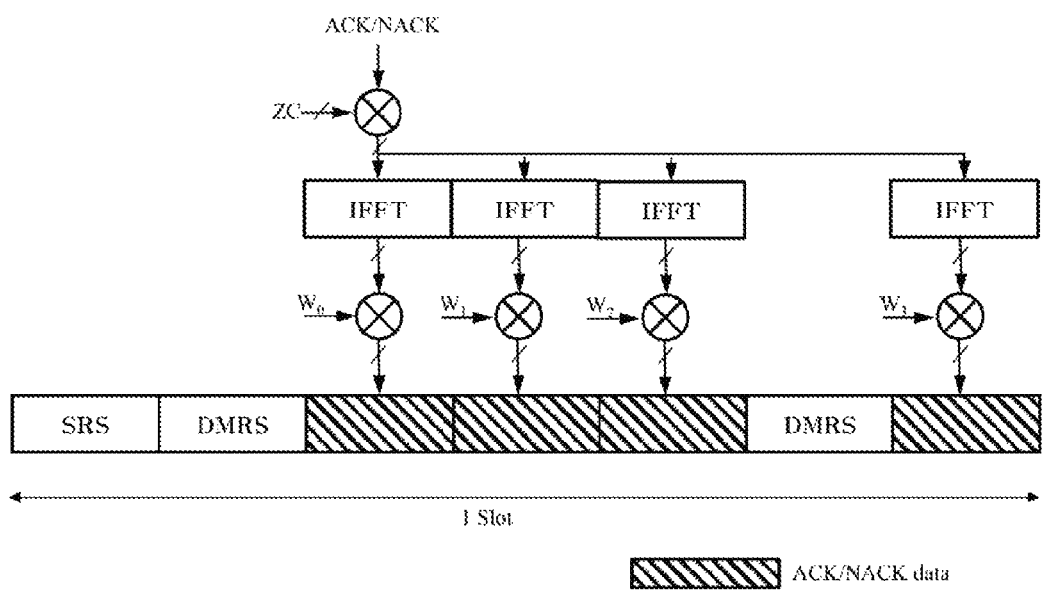
FIG. 12B is a view illustrating a shortened PUCCH format according to another embodiment of the present invention.

In order to simultaneously transmit the additional SRS symbol and the HARQ-ACK, a new PUCCH format may be defined. FIGS. 11B and 12B illustrate the shortened PUCCH format according to one embodiment. The shortened PUCCH format of FIG. 11B has a mirrored structure of the shortened PUCCH format of FIG. 11A, and the shortened PUCCH format of FIG. 12B has a mirrored structure of the shortened PUCCH format of FIG. 12A.

Referring to FIG. 11B, the first SC-FDMA symbol of a specific slot is allocated to SRS transmission. The specific slot may be a second slot or a first slot. In accordance with one embodiment, the shortened PUCCH format of FIG. 11A and the shortened PUCCH format of FIG. 11B may be mapped to different slots. However, the shortened PUCCH format of FIG. 11A and the shortened PUCCH format of FIG. 11B may not be multiplexed in the same PRB. HARQ-ACK data and DMRS may be CDM-processed by an orthogonal cover having the length of 3 within the shortened PUCCH formats of FIGS. 11A and 11B, and the SRS symbols are established at different positions, such that orthogonality between the shortened PUCCH formats of FIGS. 11A and 11B are lost or damaged. Accordingly, the method for discriminating between the shortened PUCCH format of FIG. 11B and the shortened PUCCH format of FIG. 11A may be used.

In accordance with another embodiment, if additional SRS transmission and HARQ-ACK transmission are generated in the same subframe, the additional SRS transmission may be dropped. Therefore, the UE may transmit the SRS in the symbols additionally allocated when the UE does not simultaneously transmit the HARQ-ACK and the SRS.

(2) Method for Increasing the Number of TCs (Transmission Combs) of SRS

In accordance with one embodiment, the number of TCs (or frequency combs FCs) available in PRB where SRS is transmitted may also be increased. In the legacy LTE system, a total of 2 TCs (e.g., Comb 0, Comb 1) was used in SRS transmission. For example, assuming that UE 1 transmits SRS through any one of 2 TCs and UE 2 transmits SRS through another TC, UE1 SRS and UE2 SRS are mapped to different subcarriers on the frequency axis (e.g., frequency multiplexing) although UE1 and UE2 simultaneously transmit the SRS. In more detail, assuming that the indexes of RE mapped to SRS are denoted by (k, l) (e.g., k is a subcarrier index, and l is the SC-FDMA symbol index), UE1 transmits the SRS through REs in which k is an even number, and UE2 transmits the SRS through REs in which k is an odd number. As described above, since SRS is mapped on the basis of 2 REs within the PRB, one UE transmits the SRS at 6 REs per PRB on the condition that the PRB includes 12 subcarriers.

In accordance with one embodiment, a maximum of 4 TCs (e.g., Comb 0~Comb 3) may be supported for SRS. Therefore, SRS multiplex capacity for one symbol may be doubled. If 4 TCs are supported, SRS is mapped on the basis of 4 REs within the PRB. One UE transmits the SRS through one RE per 4 REs. Three different UEs may transmit the SRS in the remaining 3 REs from among the 4 REs.

Only one of the 4 TCs (e.g., Comb 0~Comb 3) may be assigned to one UE. Therefore, the BS transmits additional bits, such that any one TC may be established per UE. The additional bits for indicting the TC may be transmitted through RRC signaling.

Meanwhile, if the SRS bandwidth is small, a total number of SRS REs available in channel estimation is reduced, such that channel estimation throughput may be deteriorated. In the PRB in which SRS (hereinafter referred to as 2-TC SRS) supporting a maximum of 2 TCs, transmission of SRS (hereinafter referred to as 4-TC SRS) supporting a maximum of 4 TCs may be prohibited. For example, it is impossible to multiplex 2-TC SRS and 4-TC SRS in the same PRB. 2-TC SRS is mapped on the basis of 2 REs within the corresponding PRB, such that 6 REs for each PRB are used for 2-TC SRS. In contrast, 4-TC SRS is mapped on the basis of 4 REs, such that 3 REs for PRB may be used for 4-TC SRS. Therefore, orthogonality between 2-TC SRS and 4-TC SRS is damaged or lost.

In order to address the above-mentioned problem, the embodiment of the present invention can allocate different time resources (e.g., subframes) to 2-TC SRS and 4-TC SRS. For example, when the BS establishes a UE-specific SRS subframe, subframes needed for transmission of a 2-TC SRS and 4-TC SRS may be established in different ways. Therefore, 2-TC SRS and 4-TC SRS may be multiplexed on the time axis.

In accordance with another embodiment, an SRS band needed for 2-TC SRS transmission and a band needed for 4-TC SRS are established in different ways, such that the SRS band and the band may be mutually multiplexed. For example, if SRS frequency hopping is activated, the 2-TC SRS frequency hopping pattern and the 4-TC SRS frequency hopping pattern may be established in a manner that 2-TC SRS and 4-TC SRS are not transmitted on the same SRS band.

In UpPTS of the TDD special subframe, a plurality of symbols may also be used for SRS transmission. For example, the UE may transmit the SRS through one symbol of UpPTS, and may transmit the SRS through 2 symbols.

In accordance with one embodiment, 4-TC SRS may also be transmitted in the case in which symbols (i.e., the plurality of symbols available for SRS transmission) are established in UpPTS. If UpPTS includes only one SRS symbol, 2-TC SRS other than 4-TC SRS may be supported in the corresponding UpPTS. In contrast, if UpPTS includes the plurality of symbols, 4-TC SRS transmission may be allowed. However, although UpPTS includes the plurality of SRS symbols, this means that 2-TC SRS transmission is not forbidden. For example, the plurality of symbols of UpPTS may be used for 4-TC SRS transmission. In contrast, the plurality of UpPTS symbols may also be used for 2-TC SRS transmission. However, 4-TC SRS and 2-TC SRS may not be mapped to the same symbol.

According to one embodiment of the present invention, assuming that UpPTS includes the plurality of symbols, 4-TC SRS may be transmitted in some SRS symbols, and 2-TC SRS may be transmitted in the remaining SRS symbols. However, the scope or spirit of the present invention is not limited thereto. For example, when UpPTS includes 2 SRS symbols, one SRS symbol may be used for 2-TC SRS transmission, and the other SRS symbol may be used for 4-TC SRS transmission.

TDD has an insufficient number of UL subframes, such that UpPTS of the special subframe may be efficiently used for SRS transmission. If SRS symbols are established in UpPTS, 4-TC SRS may be transmitted through at least one SRS symbol. Since 4-TC SRS is transmitted as described above, the 3D-MIMO channel can be more efficiently estimated.

If the plurality of SRS symbols (e.g., 2 symbols) is established in UpPTS, the position of SRS symbol needed for 4-TC SRS transmission may be fixed. Alternatively. Information on the SRS symbols needed for 4-TC SRS transmission may also be transmitted to the UE through L1/MAC/RRC signaling.

SRS Tx Antenna Ports

Although the UE includes 2 reception (Rx) antennas, the number of SRS Tx antennas may be limited to 1. If the number of SRS Tx antennas is increased, the number of necessary power amplifiers is increased, such that production costs of the UE may also be increased.

If the number of Rx antennas of the UE supporting 3D-MIMO is set to 4, the number of SRS Tx antennas may be changed to 1, 2 or 4 according to the number of installed power amplifiers.

When the DL channel is estimated using the SRS on the condition that the number of UE Rx antennas is 4 and the number of SRS Tx antennas is set to 1 or 2, the estimation throughput may be deteriorated because the number of SRS Tx antennas is smaller than the number of Rx antennas needed for such estimation. For example, if the BS uses 16 (=4×4) Tx antennas in the 3D-MIMO system and the number of UE Rx antennas is set to 4 in the 3D-MIMO system, the BS must estimate information regarding the 4×16 downlink channels. If SRS is transmitted through 2 Tx antennas, the BS may estimate only 2×16 downlink channels, such that a DL estimation throughput is deteriorated.

In order to address the above-mentioned problem, SRS Tx antennas of the UE used in SRS transmission is switched according to lapse of time, such that the BS may estimate all DL channels.

If the SRS transmission periodicity is longer than 2 ms, the number of UE Rx antennas is M (where M>2), and the number of SRS Tx antennas is set to 1, the SRS Tx antenna index $srs_p(n)$ may be represented by the following equation 21.

$$srs_p(n) = n \bmod M \quad \text{[Equation 21]}$$

$$n = \left\lfloor \frac{\left(10 \cdot n_f + \left\lfloor \frac{n_s}{2} \right\rfloor\right)}{T_{SRS}} \right\rfloor$$

In Equation 21, $n_f$ is a system frame number (SFN), $n_s$ is a slot number, and $T_{SRS}$ is a UE-specific SRS transmission periodicity.

In Equation 21, the UE may transmit the SRS through any one of the Tx antennas, and the antennas used per SRS transmission may be sequentially changed.

Assuming that the SRS transmission periodicity is longer than 2 ms, the number of UE Rx antennas is M, and the number of SRS Tx antennas is 2, the SRS Tx antenna index $srs_p(n)$ and $srs_{p+1}(n)$ may be represented by the following equation 22.

$$srs_p(n) = 2 \cdot \left(n \bmod \frac{M}{2}\right) \quad \text{[Equation 22]}$$

$$srs_{p+1}(n) = 2 \cdot \left(n \bmod \frac{M}{2}\right) + 1$$

-continued $$n = \left\lfloor \frac{\left(10 \cdot n_f + \left\lfloor \frac{n_s}{2} \right\rfloor\right)}{T_{SRS}} \right\rfloor$$

For example, the UE may transmit the SRS through 2 SRS Tx antennas at each SRS transmission time point. 2 SRS Tx antennas may be sequentially changed every SRS transmission.

Figure 13:
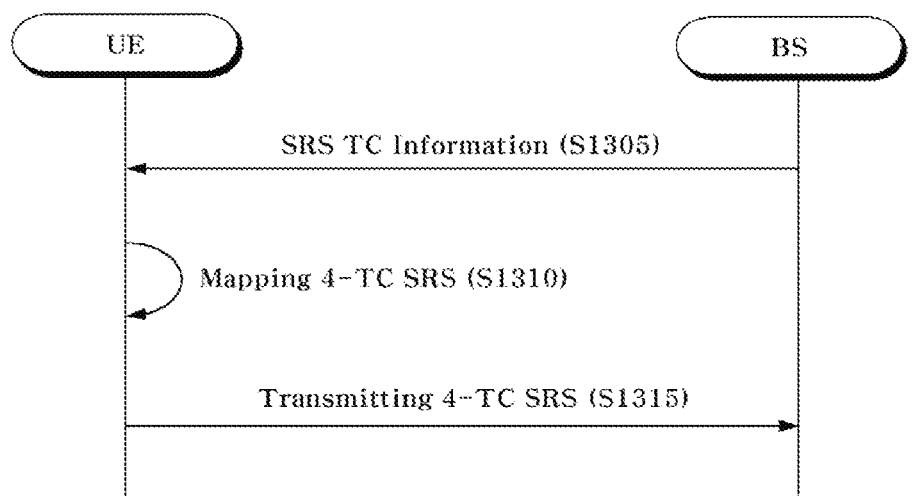
FIG. 13 is a flowchart illustrating an SRS transmission/reception method according to an embodiment of the present invention.

FIG. 13 is a flowchart illustrating an SRS transmission/reception method according to an embodiment of the present invention. Redundant matters will not be described herein for clarity.

Referring to FIG. 13, the BS may transmit the SRS configuration information for SRS transmission to the UE through RRC signaling (S1305). The SRS configuration information may be used for periodic transmission or aperiodic transmission. SRS configuration information may be transmitted through UE-dedicated RRC signaling. SRS configuration information may include TC information indicating any one of 4 TCs supported by 4-TC (Transmission Comb) SRS. For example, TC information may indicate any one of Comb 0 to Comb 3. In addition, SRS configuration information may include information on the additional symbol available for SRS transmission.

The UE may generate 4-TC SRS on the basis of SRS configuration information.

The UE may perform 4-TC SRS mapping on the basis of the SRS configuration information (S1310). For example, the UE may map 4-TC SRS to the SRS symbol of UpPTS (uplink pilot time slot) of the TDD special subframe on the basis of TC information. The UE may perform 4-TC SRS mapping in a unit of 1 resource element (RE) per 4 REs on the SRS symbol on the basis of TC indicated by TC information.

The UE may transmit 4-TC SRS (S1315). 4-TC SRS may be transmitted through UpPTS. The index of the SRS symbol mapped to 4-TC SRS within UpPTS may be fixed. 4-TC SRS transmission may be supported in the case in which several symbols are established in UpPTS. For example, if only one SRS symbol is established in UpPTS, one SRS symbol may also be used in 2-TC SRS transmission other than 4-TC SRS transmission. In the UL subframe for 2-TC SRS transmission, 4-TC SRS transmission may be disallowed.

4-TC SRS may be transmitted through one or two antenna ports from among the plurality of antenna ports. For example, if 4-TC SRS is transmitted through one antenna port, one antenna port $srs_p(n)$ may be determined on the basis of Equation 21. If 4-TC SRS is transmitted through 2 antenna ports, 2 antenna ports ($srs_p(n)$ and $srs_{p+1}(n)$) may be determined on the basis of Equation 22.

Figure 14:
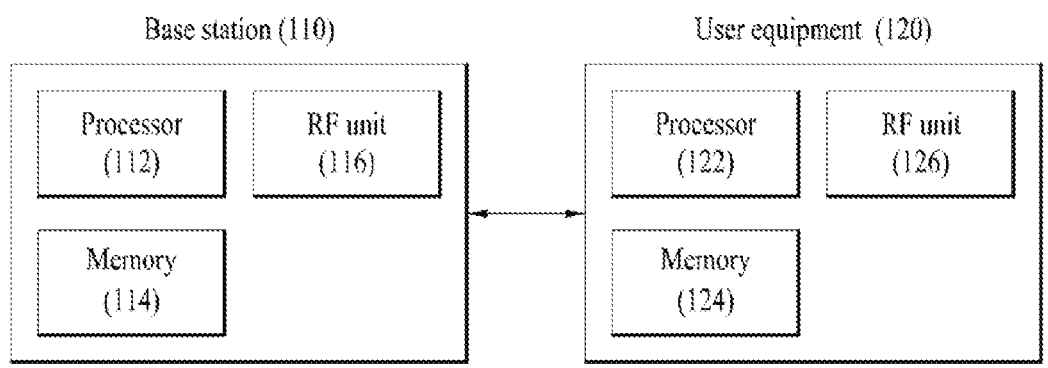
FIG. 14 is a view illustrating a user equipment (UE) and a base station (BS) according to an embodiment of the present invention.

FIG. 14 is a view illustrating a user equipment (UE) and a base station (BS) according to an embodiment of the present invention. The BS and the UE shown in FIG. 14 may perform SRS Tx/Rx operations illustrated in the above-mentioned embodiments.

Referring to FIG. 14, a wireless communication system includes a BS 110 and a UE 120. In downlink, a transmitter may be a part of the BS 110, and a receiver may be a part of the UE 120. In uplink, a transmitter may be a part of the UE 120, and a receiver may be a part of the BS 110. The BS 110 includes a processor 112, a memory 114, and a Radio Frequency (RF) unit 116. The processor 112 may be configured so as to implement the procedures and/or methods proposed in the present invention. The memory 114 is connected to the processor 112 and stores various pieces of information related to operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods proposed in the present invention. The memory 124 is connected to the processor 122 and stores various pieces of information related to operations of the processor 122. The RF unit 126 is connected to the processor 122 and transmits and/or receives RF signals. The BS 110 and/or the UE 120 may have a single antenna or multiple antennas.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', etc.

The above-described embodiments of the present invention can be implemented by a variety of means, for example, hardware, firmware, software, or a combination thereof. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention as described above are applicable to various wireless communication systems such as the 3GPP wireless communication system.

The invention claimed is:

1. A method for transmitting a sounding reference signal (SRS) by a user equipment (UE) in a wireless communication system supporting Time Division Duplex (TDD), the method comprising:
   receiving transmission comb (TC) information indicating any one of a total of 4 TCs supported by a 4-TC SRS;
   mapping the 4-TC SRS to an SRS symbol of an Uplink Pilot Time Slot (UpPTS) of a TDD special subframe based on the TC information; and
   transmitting the 4-TC SRS through the UpPTS,
   wherein in the mapping of the 4-TC SRS, the 4-TC SRS is mapped in a unit of 1 resource element (RE) per 4 REs on the SRS symbol based on a TC indicated by the TC information, and
   wherein the transmission of the 4-TC SRS is supported when a plurality of symbols are configured in the UpPTS.

2. The method according to claim 1, wherein
   when a single symbol is configured in the UpPTS, the single symbol supports transmission of a 2-TC SRS other than the 4-TC SRS.

3. The method according to claim 1, wherein an index of the SRS symbol to which the 4-TC SRS mapped is fixed within the UpPTS.

4. The method according to claim 1, wherein the transmission of the 4-TC SRS is not allowed in an uplink subframe in which a 2-TC SRS is transmitted.

5. The method according to claim 1, further comprising:
   receiving information on an additional symbol available for SRS transmission from a base station (BS) through RRC signaling.

6. The method according to claim 1, wherein the 4-TC SRS is transmitted through one or two of a plurality of antenna ports of the UE.

7. The method according to claim 6, wherein:
   if the 4-TC SRS is transmitted through a single antenna port, the single antenna port $srs_p(n)$ is determined by the following equation A, $$srs_p(n) = n \bmod M \qquad \text{[Equation A]}$$

$$n = \left\lfloor \frac{\left(10 \cdot n_f + \left\lfloor \frac{n_s}{2} \right\rfloor\right)}{T_{SRS}} \right\rfloor$$

where M is the number of reception (Rx) antennas of the UE, $n_f$ is a system frame number (SFN), $n_s$ is a slot number, and $T_{SRS}$ is a UE-specific SRS transmission periodicity.

8. The method according to claim 6, wherein:
if the 4-TC SRS is transmitted through two antenna ports, the two antenna ports $srs_p(n)$ and $srs_{p+1}(n)$ are determined by the following equation B, $$srs_p(n) = 2 \cdot \left(n \bmod \frac{M}{2}\right)$$
$$srs_{p+1}(n) = 2 \cdot \left(n \bmod \frac{M}{2}\right) + 1$$
$$n = \left\lfloor \frac{\left(10 \cdot n_f + \left\lfloor \frac{n_s}{2} \right\rfloor\right)}{T_{SRS}} \right\rfloor$$

[Equation B]

where M is the number of reception (Rx) antennas of the UE, $n_f$ is a system frame number (SFN), $n_s$ is a slot number, and $T_{SRS}$ is a UE-specific SRS transmission periodicity.

9. A user equipment (UE) for transmitting a sounding reference signal (SRS) in a wireless communication system supporting Time Division Duplex (TDD) comprising:
a receiver to receive transmission comb (TC) information indicating any one of a total of 4 TCs supported by a 4-TC SRS;
a processor to map the 4-TC SRS to an SRS symbol of an Uplink Pilot Time Slot (UpPTS) of a TDD special subframe based on the TC information; and
a transmitter to transmit the 4-TC SRS through the UpPTS,
wherein in mapping the 4-TC SRS the processor maps the 4-TC SRS in a unit of 1 resource element (RE) per 4 REs on the SRS symbol based on a TC indicated by the TC information, and
wherein the 4-TC SRS transmission is supported when a plurality of symbols are configured in the UpPTS.

10. A method for receiving a sounding reference signal (SRS) by a base station (BS) in a wireless communication system supporting Time Division Duplex (TDD) comprising:
transmitting transmission comb (TC) information indicating any one of a total of 4 TCs supported by a 4-TC SRS; and
receiving the 4-TC SRS mapped to an SRS symbol of an Uplink Pilot Time Slot (UpPTS) of a TDD special subframe based on the TC information,
wherein the 4-TC SRS is mapped in a unit of 1 resource element (RE) per 4 REs on the SRS symbol based on a TC indicated by the TC information, and
wherein the reception of the 4-TC SRS is supported when a plurality of symbols are configured in the UpPTS.

11. The method according to claim 10, wherein
when a single symbol is configured in the UpPTS, the single symbol supports transmission of a 2-TC SRS other than the 4-TC SRS.

12. The method according to claim 10, wherein an index of the SRS symbol to which the 4-TC SRS mapped is fixed within the UpPTS.

13. The method according to claim 10, wherein a transmission of the 4-TC SRS is not allowed in an uplink subframe in which a 2-TC SRS is transmitted.

14. The method according to claim 10, further comprising:
transmitting, to a user equipment (UE) through RRC signaling, information on an additional symbol available for SRS transmission.

15. The method according to claim 10, wherein the 4-TC SRS is transmitted through one or two of a plurality of antenna ports of a user equipment (UE).

* * * * *